(12) United States Patent
Schneider (10) Patent No.: US 9,667,137 B2
(45) Date of Patent: May 30, 2017

(54) SYSTEM TO INCREASE THE IN-LINE POWER FACTOR OF A THREE-PHASE BRUSHLESS DC MOTOR

(71) Applicant: ebm-papst Mulfingen GmbH & Co. KG, Mulfingen (DE)

(72) Inventor: Fabian Schneider, Rot am See (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 63 days.

(21) Appl. No.: 14/822,925

(22) Filed: Aug. 11, 2015

(65) Prior Publication Data

US 2016/0049889 A1 Feb. 18, 2016

(30) Foreign Application Priority Data

Aug. 12, 2014 (DE) .................. 10 2014 111 451

(51) Int. Cl.
| | |
|---|---|
| *H03K 17/60* | (2006.01) |
| *H02M 1/42* | (2007.01) |
| *H02M 7/00* | (2006.01) |
| *H02P 6/00* | (2016.01) |
| *H02P 6/14* | (2016.01) |
| *H02M 1/00* | (2006.01) |

(52) U.S. Cl.
CPC ........... *H02M 1/4216* (2013.01); *H02M 7/00* (2013.01); *H02P 6/002* (2013.01); *H02P 6/14* (2013.01); *H02M 2001/0009* (2013.01); *Y02B 70/126* (2013.01); *Y02P 80/112* (2015.11)

(58) Field of Classification Search
CPC .................................................. H02M 3/158

USPC .............................. 318/785; 323/283; 363/67
See application file for complete search history.

(56) References Cited

U.S. PATENT DOCUMENTS

| | | | | |
|---|---|---|---|---|
| 2010/0079124 A1* | 4/2010 | Melanson | ............. | H02M 3/156 323/283 |
| 2013/0188404 A1* | 7/2013 | Nakamura | ............. | H02M 5/458 363/37 |

OTHER PUBLICATIONS

Madishetti, Improved power quality converter for direct torque control-based induction motor drives, May 24, 2012, IET Power Electronics.*

* cited by examiner

*Primary Examiner* — Jorge L Carrasquillo
*Assistant Examiner* — Cortez Cook
(74) *Attorney, Agent, or Firm* — Harness, Dickey & Pierce, P.L.C.

(57) ABSTRACT

The present invention relates to a control system and a method for raising the mains-side power factor λ of three-phase fed EC motors having a dc voltage intermediate circuit (2) with an intermediate center tap (DCM) for generating a positive and a negative intermediate circuit potential (DC+, DC−), comprising three active bridge arms (Ia, IIa, IIIa), each of which are connected to a subordinate two-point current control (ZPR1, ZPR2, ZPR3) and, in each case, via said current control to a superimposed intermediate circuit voltage control (3), which controls the potential difference between the middle circuit potentials (DC+, DC−) via set point settings for the subordinate two-point current controllers (ZPR1, ZPR2, ZPR3).

14 Claims, 5 Drawing Sheets

SYSTEM TO INCREASE THE IN-LINE POWER FACTOR OF A THREE-PHASE BRUSHLESS DC MOTOR

The invention relates to a control system for raising the mains-side power factor λ of three-phase fed EC motors according to the features of patent claim 1, and to a method using such a control system according to the features of patent claim 14.

EC motors (EC=electronically commutated) are sufficiently known and are used for numerous applications. An EC motor is known to be a permanently magnetically excited, slip ring-free synchronous motor, which is typically provided with a rotor position sensor, and is operated via commutation electronics (control electronics and power electronics) at a dc voltage. This dc voltage may be obtained, for example, as intermediate circuit dc voltage by rectifying a mains ac voltage. The commutation electronics generates a, in particular, three-phase ac voltage from the dc voltage as a function of the rotor position for generating a rotating field in the stator winding.

As a result of the purely electronic slip ring-free commutation, neither brush noises nor wear occurs. These motors are therefore maintenance free. Thanks to the electronic control, it is possible to easily implement auxiliary functions, such as a stepless speed control, a change of rotation, a soft start and/or a locked rotor protection. Speed setting is generally achieved by a PWM clocking with an adjustable or controllable duty factor (duty cycle).

It is known that a dc voltage for an EC motor may be obtained, for example, as an intermediate circuit dc voltage from a mains ac voltage by means of an inverter, which is normally fed from a capacitive intermediate circuit. For a maximally constant dc voltage, a relatively high capacitance formed from one or multiple capacitors is disposed in the intermediate circuit. The charging of the capacitance generally occurs via the rectifier. However, this results in a high harmonic content and a poor power factor.

To correct this, so-called PFC circuits are frequently employed (PFC=power factor correction). Such PFC circuits may be subdivided into two categories. The first category is formed by the passive PFC circuits in the form of chokes or other passive components, the second category is formed by active PFC circuits, which are frequently constructed in the form of boost converters, also referred to as step-up converters, cf. in this regard, for example, the publication EP 2 267 882 A1.

One disadvantage of this PFC concept is the need for an inverter as well as the integration of an additional PFC choke. The inverter causes undesirable losses due a forward bias of the diodes. The PFC choke is comparatively expensive and requires a large installation space.

A further aspect in the design of the topology of intermediate circuits is the problem of the mains-side power factor λ. In power supply units, a maximally high power factor is sought in order to avoid transmission losses. In electrical engineering, power factor is referred to as the ratio of the amount of active power P to apparent power S. Ideally, the power factor is 1, although in practice, in the case of inductive load, it is only about 0.95 (inductively). In addition, there is the risk of self-excitation in the case of asynchronous machines if the reactive power is fully or nearly fully compensated for. On the other hand, a capacitive power factor results in over-voltages on insulations of lines and electrical consumers.

In the known prior art concepts for three-phase fed EC motors having a passive B6 bridge rectifier circuit for feeding the dc voltage intermediate circuit from the three-phase ac mains, it is possible to obtain power factors of approximately 0.95 given a current distortion factor of approximately 30%. The power factor, due to the mathematical correlation, is known to be a function of both the distortion factor THD (total harmonic distortion) as well as of the phase shift φ of the principal harmonic, in which an increase in the distortion factor THD results in a reduction of the power factor.

Accordingly, it is an object of the present invention to overcome the aforementioned disadvantages and to provide a system for raising the mains-side power factor λ of three-phase fed EC motors having a dc voltage intermediate circuit, which may be implemented in a cost-efficient and space-saving manner, and with which the ratio of the absorbed active power to apparent power may be increased to close to its ideal value of 1.

These objects are achieved by a circuit configuration having the features of patent claim 1 and by the method having the features of patent claim 14.

A first aspect of the present invention is the replacement of bridge arms known in the prior art as well as the large-volume linear chokes of the bridge rectifier circuit (B6) by active bridge arms. The bridge rectifier circuit in the prior art is formed from a total of six slow rectifier diodes and one linear choke, two diodes, respectively, being used in one bridge arm, in which the three half bridge arms, consisting of a rectified series circuit made up of two rectifier diodes are each connected on the cathode side to the positive and, on the anode side, to the negative intermediate circuit potential and at the center tap to the three mains phases.

The active bridge arms according to the invention consist of six diodes and one active switch such as, for example, a MOSFET or IGBT (bipolar transistor having an isolated gate electrode). In addition, a shunt resistor Rs is also integrated in each bridge arm for measuring current. With the topology according to the invention, it is possible to eliminate completely the large-volume linear choke integrated in the path between rectifier half bridges and intermediate circuit for the purpose of passive power factor correction. Moreover, a contacting of the center tap (DCM) of the intermediate circuit capacitance formed from a series connection of two capacitors takes place. Due to the selected three-point topology, the active components may be used at a dielectric strength of 600 V, given mains input voltages of up to 530 V and at intermediate circuit voltages of up to 800 V, which permits the selection of components having lower power losses and switching losses as compared to a two-point topology having 1200 V semiconductors.

Each active half bridge arm includes four nodes, each consisting of two extremely rapid freewheeling diodes DF+ and DF−, as well as two medium-rapid center diodes DM+ and DM−, and two slow mains diodes DN+ and DN−. Connected at a first node are the cathodes of the slow mains diode DN+ and the midpoint diode DM−, as well as the anode of the rapid freewheeling diode DF+ and the drain or collector terminal of the switch S. Connected at a second node are the anodes of the mains diode DN− and midpoint diode DM+, as well as the cathode of the freewheeling diode DF− and the first terminal of the shunt resistor. The second terminal of the shunt resister is, in turn, connected to the source, respectively, emitter of the switch S.

Interconnected at the third node are the cathode of the mains diode DN−, as well as the anode of the mains diode DN+ and there is a connection to the respective mains phases. The intermediate circuit center tap is connected at the fourth node to the cathode of the midpoint diode DM+ and to the anode of the midpoint diode DM−.

The terminals of the shunt resistor and the gate of the switch serve as a connection to the current controller situated on the respective switch potential of the half bridges. The positive intermediate circuit potential DC+ is connected to the cathode of the freewheeling diode DF+, the negative intermediate circuit potential DC− is connected to the anode of the freewheeling diode DF−.

Another aspect of the present invention relates to the elimination of switching frequency components in the input variables. For this purpose, the previously described active bridge circuit is integrated with the active bridge arms into a mains-side filter structure. The mains-side filter structure is advantageously formed from a single-stage or two-stage LC filter, as well as an appropriately provided capacitive feedback of the neutral point of the filter capacitances to the intermediate circuit tap DCM. In an embodiment having a two-stage filter, the feedback takes place from the neutral point of the filter capacitances situated closer to the bridge circuit. In addition, a capacitance (capacitor) is introduced into the feedback path that is connected to the intermediate circuit midpoint DCM. This circuit typology and the capacitive connection of the neutral point of the filter capacitors to the intermediate circuit midpoint DCM via the capacitor make possible a targeted common mode current flow to the intermediate circuit and noticeably reduces the common mode interference emission via the mains phases.

Another aspect of the present invention relates to the controlling of the system, i.e., the circuit configuration. In one preferred embodiment, a cascade control is provided for controlling. The cascade control is formed from three current controllers, the latter being at the respective switch potential of the half bridge arms. The three current controllers at the respective switch potential are preferably supplied by a suitable switch mode power supply with three galvanically separated output voltages. The switch potential is the potential of the negative shunt resistor terminal.

For the purpose of cascade control, a superimposed intermediate circuit voltage control is provided, which controls the voltage between the potentials DC+ and DC−, as well as the position of the potential of the intermediate circuit center tap DCM via the setpoint setting for the subordinate current controllers. This allows the desired power factor to be set by predetermining the current setpoints for the subordinate current controllers so that the desired power factor results from the wave form and phase relation of the set-point values, whereas the desired intermediate circuit voltage results from the amplitude of the set points.

It is also provided to achieve a balancing of the potentials at the intermediate circuit capacitors, and thereby to adjust the potential at the intermediate circuit center tap DCM accordingly. This aim is achieved in that a sign-equivalent set point current component is preset, respectively, for all three subordinate current controllers (zero system). In a particularly advantageous embodiment, the set point for the subordinate current controllers is preset across a galvanic isolating section by means of pulse width modulation (PWM). The PWM may be achieved with the aid of known optocouplers and/or by capacitive or inductive couplers. In another advantageous embodiment, the subordinate current controllers are implemented as peak current controllers ("peak-current mode" controllers). The current controllers switch on the respective switch S of the associated half bridges as soon as a synchronization pulse, generated by the superimposed voltage control and also transmitted across the galvanic isolating section, occurs. Due to the switching of the switch S, the result in the mains phase is an increase in the amount of current.

By positioning the respective switch and shunt resistors in the two diode bridges, the current flow through the switch and shunt resistors is always positive and corresponds to the amount of current in the respective mains phase, respectively, through the PFC chokes. This current, which flows via the switching path of the switch and, accordingly, through the shunt resistor, can be measured in the on-state of the switch S at the shunt resistor. The respective switch is switched off and the amount of current in the respective mains phase then drops again once the amount of current measured via the voltage at the shunt resistor exceeds the predetermined set point across the galvanic isolation section. The switch in this case remains switched off until a further synchronization pulse occurs. During the delay time of the switch S, i.e., when the switch is in its non-conductive state, no current can be detected at the shunt resistor for lack of current flow.

In one preferred arrangement, the subordinate two-point current controller may be implemented by means of a RS flip-flop and a comparator. The RS flip-flop has the inputs setting and resetting. The setting input is provided for receiving the synchronization pulse and, consequently, is connected to the superimposed control. The synchronization pulse from the superimposed control, as previously described, is used to switch on the associated switch. The flip-flop in this case has a higher priority for the setting input over the resetting input. This may ensure a minimum switch-on time of the switch for the duration of the synchronization pulse. The resetting input of the flip-flop is connected to the output of the comparator, the positive input of which is connected via a RC low-pass filter for filtering interferences to the positive shunt terminal of the respective half bridge. The negative input of the comparator is connected to the reference signal reference point for the set current. The output of the flip-flop is connected via a gate driver circuit, respectively, a driver IC to the gate of the power switch.

The reference potential of all voltages is the switch potential on the side of the galvanic isolation section facing the switch, thus, the potential of the negative shunt terminal. The reference signal is obtained by a low-pass filtering via a second-order RC filter from the buffered pulse width modulated (PWM) set current signal. By buffering the digital pulse width modulated (PWM) signal with a logic gate, which draws its supply voltage from a reference voltage source situated on the respectively galvanically isolated side, it is possible, subsequent to the low-pass filtering, to generate an analogous reference current signal with a voltage value scaled according to the pulse width from zero to as much as the reference voltage.

The superimposed intermediate circuit voltage control consists of a PI controller (proportional integral controller) for the intermediate circuit voltage which, as an input variable, receives the control difference between the intermediate circuit voltage set point and the sum of the voltages at the intermediate circuit capacitors. An additional PI controller is used for balancing the voltages at the intermediate circuit capacitances, i.e., an adjusting of the potential of the center tap DCM to the mean value of the middle circuit potential. For this purpose, the PI controller receives as an input signal the control difference from the voltages at the intermediate circuit capacitors. The output signal of the intermediate circuit voltage controller is multiplied by the amounts of the reference signals, the output signal of the balance controller by the sign (+1, −1) of the reference signals. The reference signals represent a standardized three-phase symmetrical system, i.e., sinusoidal with a 120° phase shift and an amplitude of one. The reference signals are obtained via sine functions from the phase angle of three-phase phase control loop (PLL) synchronized to the three mains voltages, so that the phase relation thereof corresponds to the mains neutral voltages. The results of the multiplication of the output variable of the intermediate circuit voltage controller by the reference signals as a part of each phase, and of the output variable of the balance controller by the reference signals are totaled and in each case supplied to a pulse width modulator. This pulse width modulator converts the supplied current set point into a high-frequency pulse width modulated digital signal having a pulse width proportional to the current set point, which is supplied to the subordinate current controllers via a simple and cost-effective digital galvanic isolation section (C-coupler, I-coupler, optocoupler). The pulse frequency in this case is selected so that said frequency is one order of magnitude above the limit frequency of the low-pass filter of the subordinate current controllers which, in turn, is approximately one order of magnitude above the maximal mains frequency of the current set point to be transmitted.

In order to compensate for current harmonics in the mains occurring additionally as a result of the less than ideal control behavior of the subordinate current controllers, it is possible, instead of generating purely sinusoidal reference signals, for a sign-appropriate reverse injection of harmonic reference signals to take place. This may further reduce the current distortion factor.

The superimposed voltage control also includes a pulse generator for generating the synchronization pulses for setting the flip-flop in the subordinate current controllers. In such case, it is possible to determine the minimum switch-on duration of the power switch over the duration of the positive pulse. The pulse frequency of the synchronization signal establishes the maximum switching frequency of the two-point controller.

Other advantageous refinements of the invention are characterized in the subclaims and are described in greater detail below together with the description of the preferred implementation of the invention with reference to the figures, in which:

Figure 1:
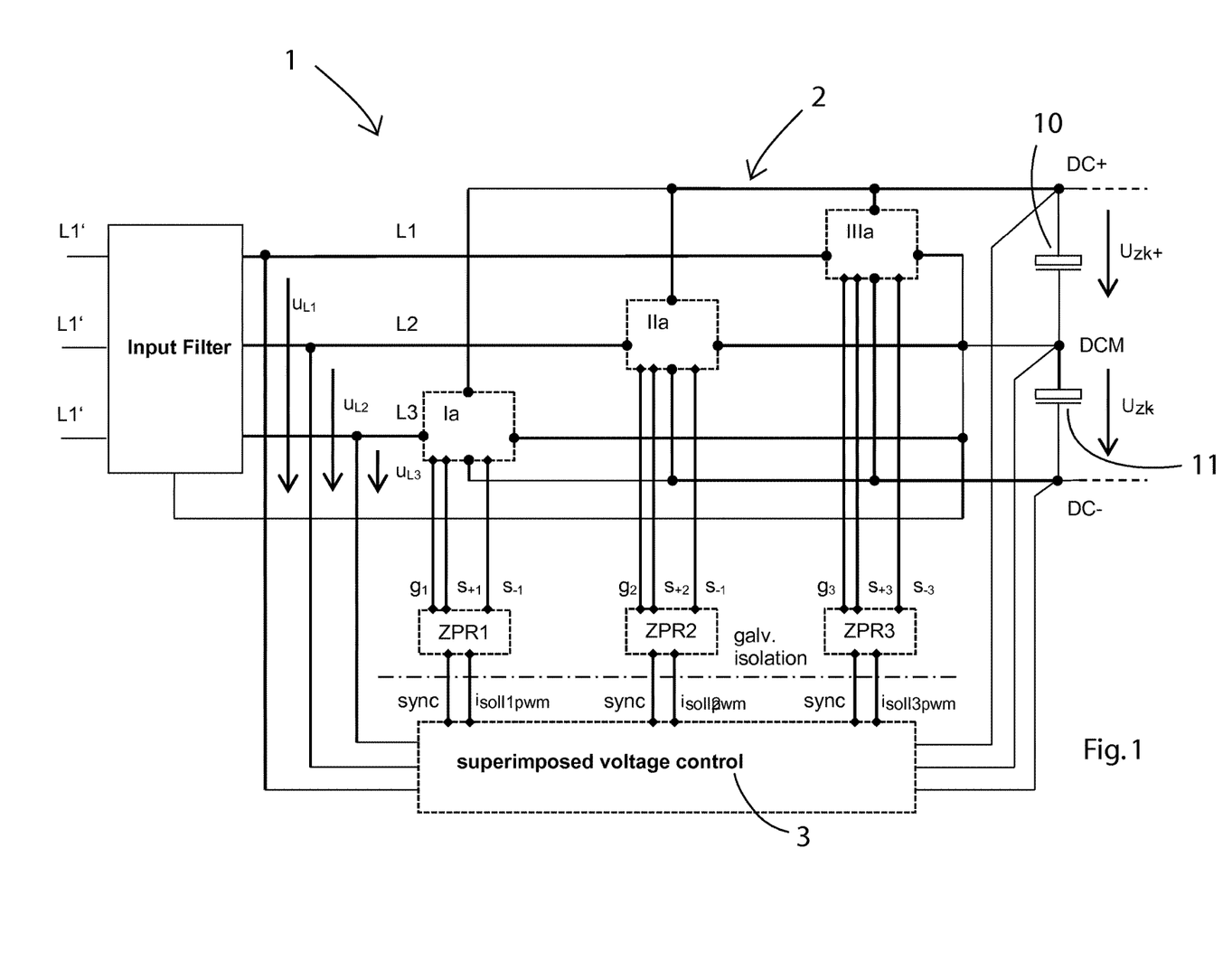
FIG. 1 shows a circuit typology of one exemplary embodiment of the present invention having a cascade control.

FIG. 1 depicts an exemplary embodiment of a circuit topology according to the invention having a cascade control. A control system 1 is shown for raising the mains-side power factor λ of three-phase fed EC motors having a dc voltage intermediate circuit 2 for generating a positive and a negative intermediate circuit potential DC+, DC− and a potential in between at the intermediate circuit center tap DCM. The positive intermediate circuit potential DC+ refers to the potential at the upper tap of the intermediate circuit capacitance 10, whereas the negative intermediate circuit potential DC− refers to the potential at the lower tap of the intermediate circuit capacitance 11. The intermediate circuit voltage component Uzk+ refers to the potential difference between the potentials DC+ and DCM, whereas the intermediate circuit voltage component Uzk− refers to the potential difference between the potentials DCM and DC−. The intermediate circuit voltage is the sum of the voltage components Uzk+ and Uzk−.

The control system 1 comprises three active bridge arms Ia, IIa, IIIa, which will be described in greater detail below in conjunction with FIG. 2. Also provided are three subordinate two-point current controllers ZPR1, ZPR2, ZPR3. These are connected to a superimposed intermediate circuit voltage control 3, and each may receive a synchronization pulse from the intermediate circuit voltage control 3, as well as a pulse width modulated set current signal $I_{soll1\_pwm}$, $I_{soll2\_pwm}$, $I_{soll3\_pwm}$. The intermediate circuit voltage control 3 controls the potential difference between the middle circuit potentials DC+, DC− via the set point settings for the subordinate two-point current controllers ZPR1, ZPR2, ZPR3. Situated between the superimposed intermediate circuit voltage control 3 and the subordinate two-point current controls ZPR1, ZPR2, ZPR3 is a galvanic isolation. The control system 1 also includes an input filter, the implementation of which is described in greater detail below.

Figure 2:
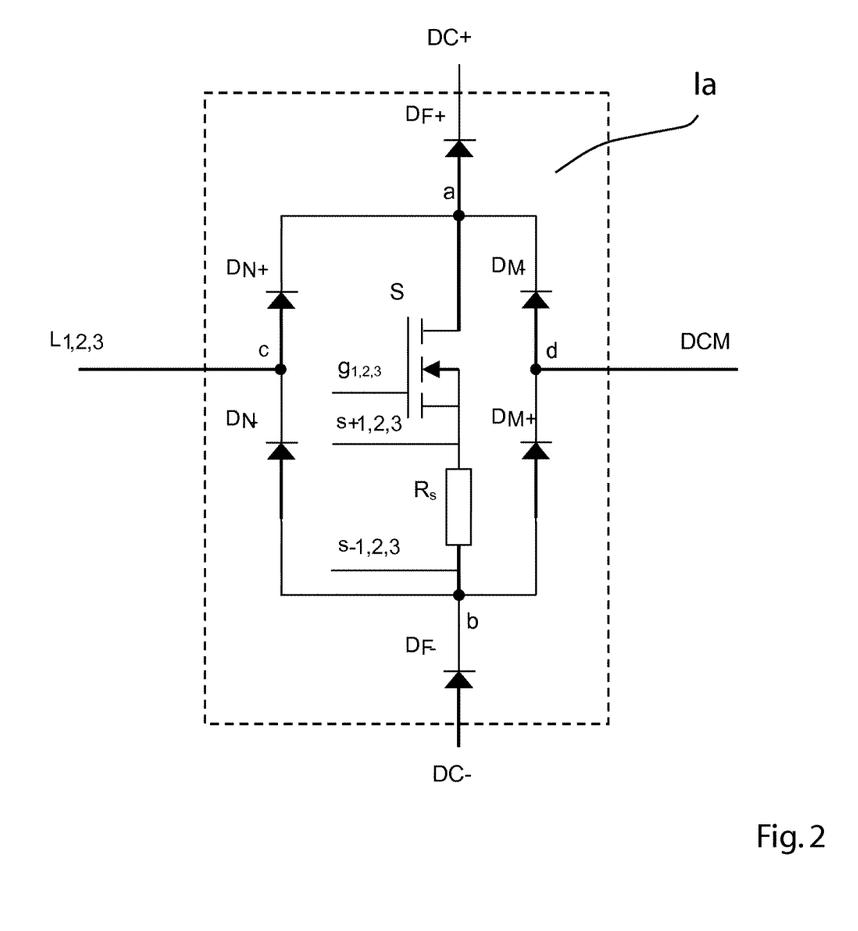
FIG. 2 shows the structural design of a bridge arm.

FIG. 2 shows the structural design of an active bridge arm, which is representative for the three bridge arms Ia, IIa, IIIa. The active bridge arms consist of six diodes DN+, DN−, DF+, DF−, DM+, DM− and an active switch S. Also integrated in each bridge arm for measuring current is an additional shunt resistor Rs. Each active half bridge arm includes four nodes a, b, c, d and each consists of two extremely rapid freewheeling diodes DF+, DF−, as well as two medium-rapid midpoint diodes DM+, DM− and two slow mains diodes DN+, DN−. The interconnection of the diodes is immediately apparent from the circuit diagram and, moreover, has been previously described in detail.

The intermediate circuit center tap DCM is connected in each case at node (d) to the cathode of the midpoint diode DM+ and to the anode of the midpoint diode DM−.

The terminals $S_{+1,2,3}$, $S_{-1,2,3}$, of the respective shunt resistor Rs, as well as the gate of the switch S serve as a connection to the current controllers ZPR1, ZPR2, ZPR3 at the respective switch potential of the bridge arms. As is apparent from FIG. 4, the terminals $S_{-1,2,3}$ connected to the respective current controller ZPR1, ZPR2, ZPR3 are at the respective reference potential. The positive intermediate circuit potential DC+ is related to the cathode of the freewheeling diode DF+, the negative intermediate circuit potential DC− is related to the anode of the freewheeling diode DF−.

Figure 3:
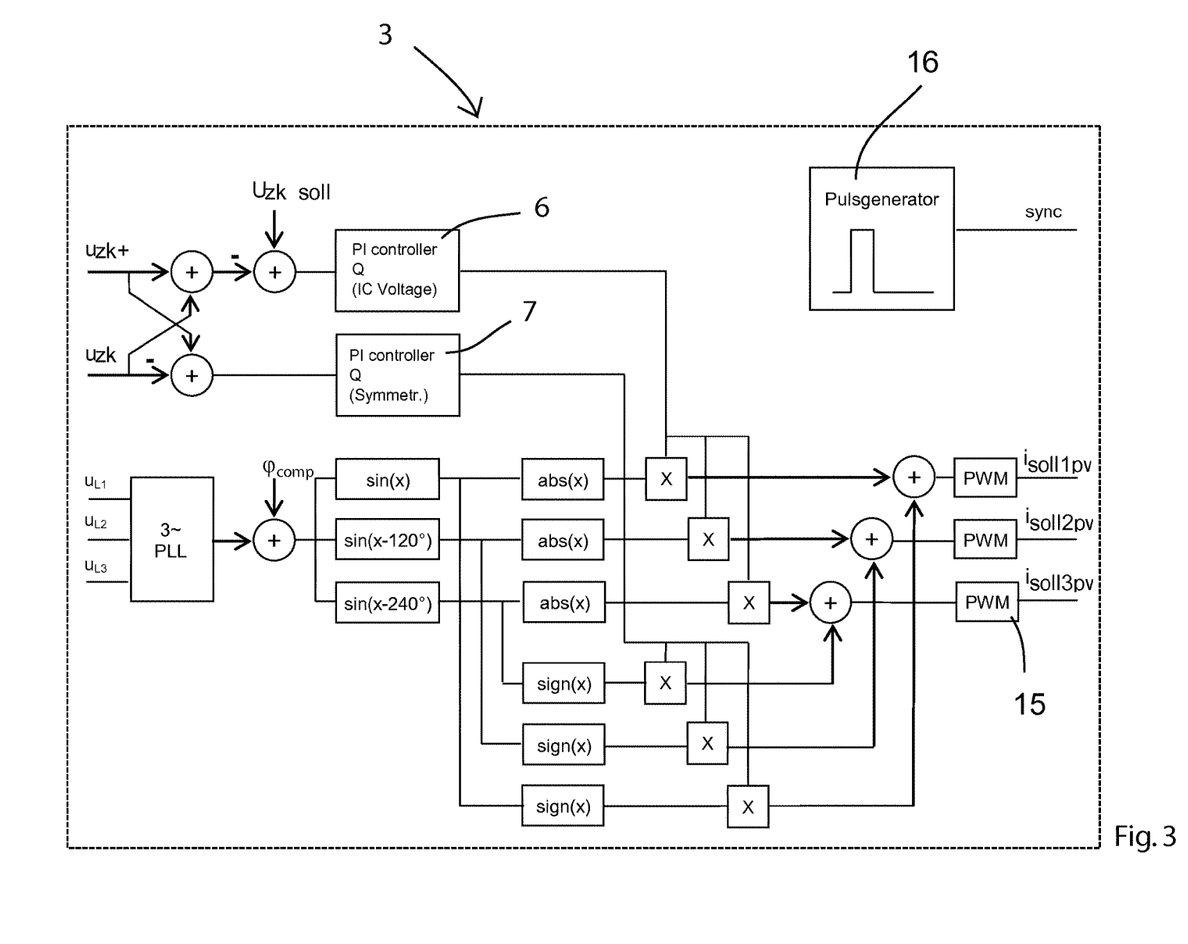
FIG. 3 shows the schematic structure of a superimposed intermediate circuit voltage control.

FIG. 3 shows the schematic structure of a superimposed intermediate circuit voltage control 3. The intermediate circuit voltage control 3 controls inter alia the position of the potential of the intermediate circuit center tap DCM via predetermined set point settings for the subordinate two-point current controllers ZPR1, ZPR2, ZPR3.

The superimposed intermediate circuit voltage control 3 consists of a PI controller 6 for the intermediate circuit voltage, which receives as an input variable the control difference between the intermediate circuit voltage set point $U_{zk\_soll}$ and the sum of the voltages at the intermediate circuit capacitors $U_{zk+}$ and $U_{zk-}$. For the purpose of voltage balancing at the intermediate circuit capacitances 10, 11, an additional PI controller 7 is provided in order to adjust the potential of the center tap DCM to the mean value of the potentials DC+ and DC−, respectively, $U_{zk+}$ equals $U_{zk-}$. For this purpose, said PI controller receives as an input signal the control difference=$(U_{zk+}-U_{zk-})$. The output signal of the intermediate circuit voltage control 3 is multiplied by the amounts of the reference signals, the output signals of the balancing control by the sign of the reference signals. The reference signals are obtained via sine functions from the phase angle φ of a three-phase control loop PLL synchronized to the three mains voltages $U_{L1}$, $U_{L2}$, $U_{L3}$, so that the phase relation thereof corresponds to the mains neutral voltages. The results of the multiplication of the output variable of the intermediate circuit voltage control by the reference signals as part of each phase and the multiplication of the output variable of the balancing control by the reference signals are totaled and supplied in each case to a pulse width modulator 15. The superimposed intermediate circuit voltage control 3 also includes a pulse generator 16 for generating synchronization pulses.

Figure 4:
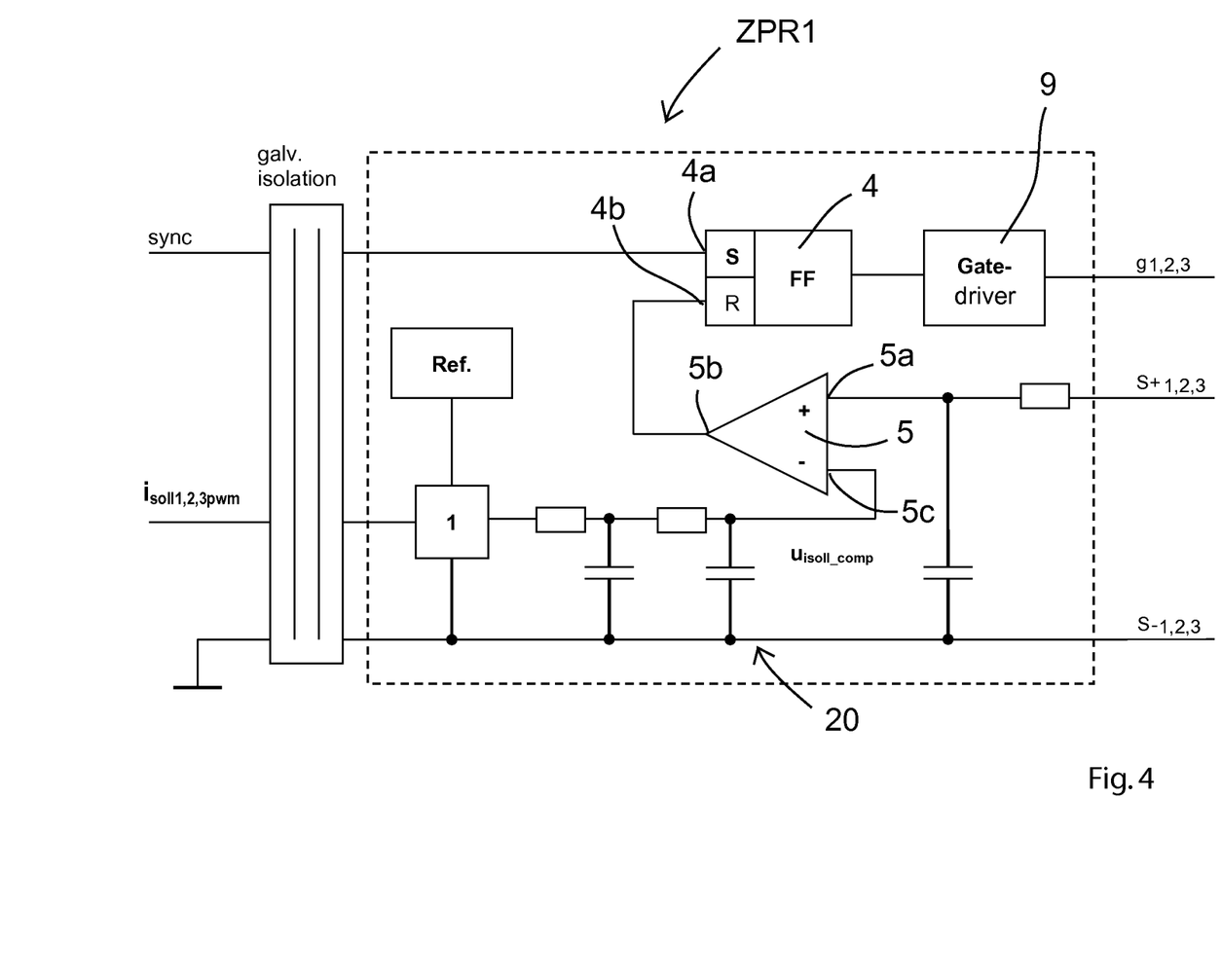
FIG. 4 shows the schematic structure of a two-point current control at switch potential.

FIG. 4 shows the schematic structure of a two-point current control ZPR1, ZPR2, ZPR3 at switch potential. Each of the subordinate two-point current controllers ZPR1, ZPR2, ZPR3 includes a RS flip-flop 4 having two inputs 4a, 4b and a comparator 5. The flip-flop 4 in this case has a higher priority for the setting input 4a over the resetting input 4b. The input 4a is the setting input for receiving the synchronization pulse for switching on the switch S, which pulse is generated by the superimposed intermediate circuit voltage control 3. The resetting input 4b of the flip-flop 4 is connected to the output 5b of the comparator 5, the positive input 5a of which is connected via a RC low-pass filter to the positive shunt terminal S+ of the respective bridge arm Ia, IIa, IIIa. The negative input 5c of the comparator 5 is connected to the reference signal via the RC low-pass filter 20 for the set current $U_{isoll\_comp}$, which is obtained from the buffered pulse width modulated set current signal $i_{soll1,2,3pwm}$. The output signal of the flip-flop 4 is connected to the gate of the power switch $g_{1,2,3}$ via a gate driver circuit 9.

Figure 5:
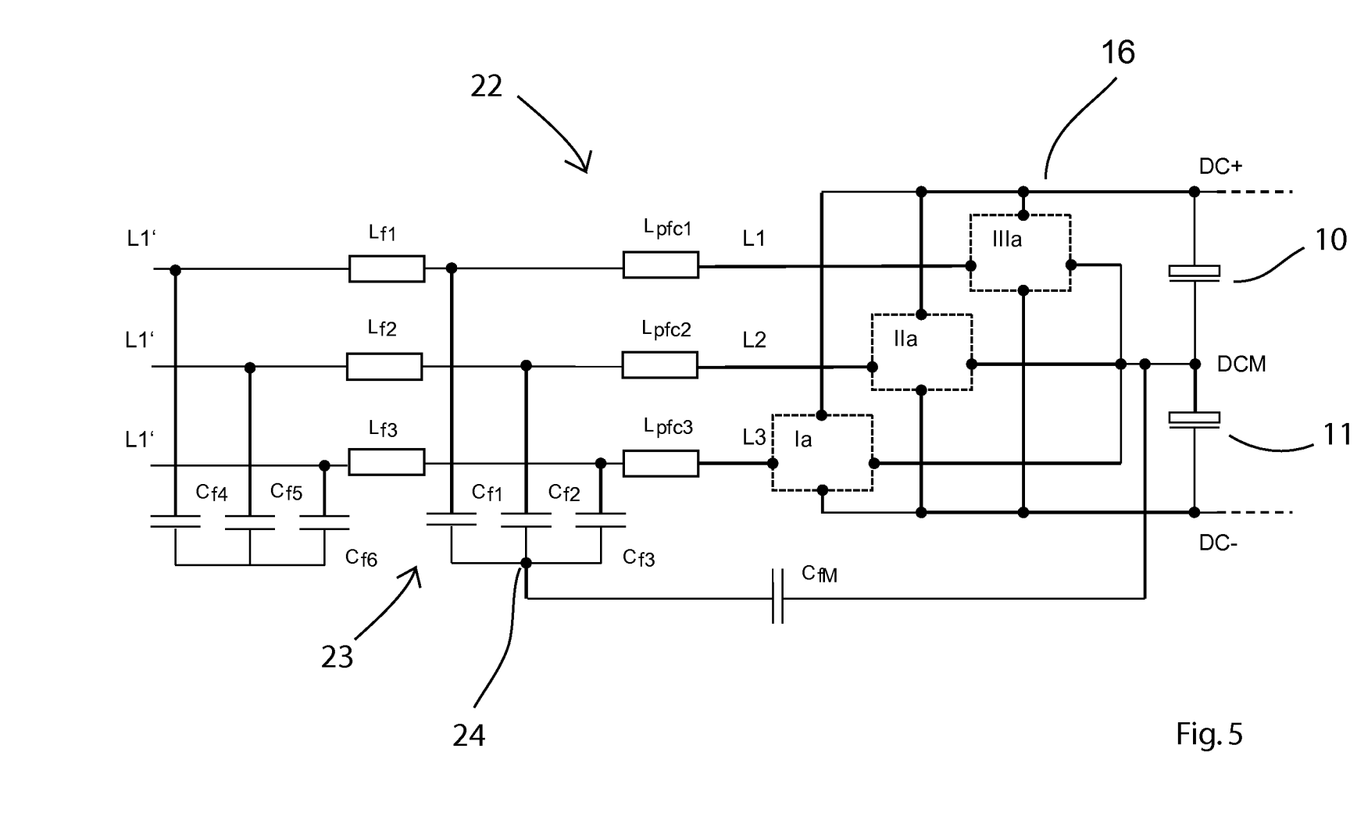
FIG. 5 shows a circuit topology of a filter structure having integrated bridge arms.

FIG. 5 depicts a circuit topology of a filter structure 22 having the integrated bridge arms Ia, IIa, IIIa. To avoid repetition with regard to the functionality of the filter structure, reference is made to the previous description and only the structural topology is exemplified in the following. The mains phases are identified by L1, L2 and L3. Each bridge branch Ia, IIa, IIIa is connected to one of the mains phases at the respective node c. Also shown is a two-stage LC filter 23, as well as the exemplified capacitive feedback of the neutral point of the filter capacitances to the intermediate circuit center tap DCM. The feedback takes place via the capacitor $C_{IM}$. The LC filter 23 comprises in each case three PFC chokes $L_{pfc1}$ to $L_{pfc3}$ and the capacitors $C_{f1}$ to $C_{f3}$, as well as the three chokes $L_{f1}$ to $L_{f3}$ and the capacitors $C_{f4}$ to $C_{f6}$.

The invention is not limited in its implementation to the preceding specified, preferred exemplary embodiments. Rather, a number of variants are conceivable, which make use of the solution depicted, even in the case of fundamentally differing implementations. For example, a single-stage LC filter 23 may be used instead of a two-stage filter.

What is claimed is:

1. A control system for raising the mains-side power factor λ of three-phase fed EC motors having a dc voltage intermediate circuit with an intermediate circuit center tap (DCM) for generating a positive and negative intermediate circuit potential (DC+, DC−), the control system comprising:

three active bridge arms (Ia, IIa, IIIa), each of which are connected to a subordinate two-point current control (ZPR1, ZPR2, ZPR3) and in each case via the latter to a superimposed intermediate circuit voltage control, which controls a potential difference between the intermediate circuit potentials (DC+, DC−) via set point settings for the subordinate two-point current controllers (ZPR1, ZPR2, ZPR3), wherein each of the active bridge arms (Ia, IIa, IIIa) are formed in each case from six diodes (DN+, DN−, DF+, DF−, DM+, DM−) and an active switch (S), as well as a shunt resistor (Rs) connected in series with a switching path (D-S) of the switch (S), and two diodes (DF+, DF−) are designed as rapidly switching freewheeling diodes, two diodes (DM+, DM−) as medium-rapid midpoint diodes and two diodes (DN+, DN−) as slow mains diodes; and, the intermediate circuit voltage control also controls a position of the potential of the intermediate circuit center tap (DCM) via a predetermined set point setting for the subordinate two-point current controllers (ZPR1, ZPR2, ZPR3).

2. The control system according to claim 1, wherein each bridge arm (Ia, IIa, IIIa) is also connected to a mains-side one- or two-stage LC filter.

3. The control system according to claim 1, wherein each of the active bridge arms (Ia, IIa, IIIa) include four nodes (a, b, c, d).

4. The control system according to claim 3, wherein a cathode of one of the slow mains diodes (DN+) and one of the midpoint diodes (DM−), an anode of one of the rapid freewheeling diodes (DF+) and a collector terminal (D) of the active switch (S), are connected at a first node, whereas an anode of the other slow mains diode (DN−) and the other midpoint diode (DM+), a cathode of the other freewheeling diode (DF−) and a negative terminal of a shunt resistor (Rs), are connected at a second node.

5. The control system according to claim 4, wherein the cathode of the one of the mains diodes (DN−), the anode of the other mains diode (DN+) and, a connection to a mains phase (L1, L2, L3), are each interconnected at a third node.

6. The control system according to claim 5, wherein a node of each active bridge arm (Ia, IIa, IIIa) is connected to the intermediate circuit center tap (DCM), the cathode of the one of the midpoint diodes (DM+) and to the anode of the other midpoint diode (DM−).

7. The control system according to claim 1, wherein a positive terminal of a shunt resistor (Rs) of a respective bridge arm (Ia, IIa, IIIa) is connected to an emitter of the active switch (S) of a relevant bridge arm (Ia, IIa, IIIa).

8. The control system according to claim 1, subordinate two-point current regulators (ZPR1, ZPR2, ZPR3) is implemented by a RS flip-flop and a comparator, wherein a setting input of the RS flip-flop for receiving a synchronization pulse is connected to the superimposed intermediate circuit voltage control.

9. The control system according to claim 8, wherein a resetting input of the flip-flop is connected to an output of the comparator and a positive input thereof is connected via a RC low-pass filter for filtering interferences to a positive shunt terminal (S+) of a respective bridge arm (Ia, IIa, IIIa).

10. The control system according to claim 1, wherein the superimposed intermediate circuit voltage control includes a first PI controller for the intermediate circuit voltage, a second PI controller for balancing voltages at two intermediate circuit capacitances for adjusting a potential of the intermediate circuit center tap (DCM) to a mean value of the intermediate circuit potentials (DC+, DC−), as well as a capacitive feedback to the intermediate circuit center tap (DCM).

11. The control system according to claim 1, wherein a cathode of one of the slow mains diodes (DN+) and one of the midpoint diodes (DM−), an anode of one of the rapid freewheeling diodes (DF+) and a collector terminal (D) of the active switch (S), are connected at a respective node, whereas an anode of the other slow mains diode (DN−) and the other midpoint diode (DM+), a cathode of the other freewheeling diode (DF−) and a negative terminal of a shunt resistor (Rs), are connected at another node.

12. The control system according to claim 1, wherein a cathode of one of the mains diodes (DN−), an anode of the other mains diode (DN+) and, a connection to a mains phase (L1, L2, L3), are each interconnected at a node.

13. The control system according to claim 1, wherein a node of each active bridge arm (Ia, IIa, IIIa) is connected to the intermediate circuit center tap (DCM), a cathode of one of the midpoint diodes (DM+) and to an anode of the other midpoint diode (DM−).

14. A method for raising the mains-side power factor $\lambda$ of three-phase fed EC motors having a dc voltage intermediate circuit, using a control system according to claim 1, the method comprising at least one of the following steps:
controlling the intermediate circuit potentials (DC+, DC−) as well as a position of the potential of the intermediate circuit center tap (DCM) via a set point setting for the subordinate two-point current controllers (ZPR1, ZPR2, ZPR3),
balancing a middle circuit potentials (DC+, DC−) at intermediate circuit capacitors by prescribing in each case a sign-equivalent set current component for all three subordinate two-point current controllers (ZPR1, ZPR2, ZPR3); and
switching a respective switch (S) as soon as a synchronization pulse generated by the superimposed intermediate circuit voltage control is received.

* * * * *